(12) United States Patent
Bernier

(10) Patent No.: US 11,930,791 B1
(45) Date of Patent: Mar. 19, 2024

(54) INSECT TRAP FOR A POOL SKIMMER BASKET

(71) Applicant: Paul Bernier, Greenville, NC (US)

(72) Inventor: Paul Bernier, Greenville, NC (US)

( * ) Notice: Subject to any disclaimer, the term of this patent is extended or adjusted under 35 U.S.C. 154(b) by 638 days.

(21) Appl. No.: 17/020,923

(22) Filed: Sep. 15, 2020

(51) Int. Cl.
  *A01K 29/00* (2006.01)
  *A01M 1/04* (2006.01)
  *A01M 1/10* (2006.01)
  *E04H 4/12* (2006.01)

(52) U.S. Cl.
  CPC .............. *A01K 29/00* (2013.01); *A01M 1/04* (2013.01); *A01M 1/103* (2013.01); *E04H 4/1272* (2013.01); *A01K 2227/706* (2013.01)

(58) Field of Classification Search
  CPC ......... A01K 29/00; A01M 1/04; A01M 1/103; E04H 4/1272
  USPC ...................................................... 4/496, 498
  See application file for complete search history.

(56) References Cited

U.S. PATENT DOCUMENTS

| D255,480 | S | 6/1980 | Zieg | |
|---|---|---|---|---|
| 4,325,462 | A | 4/1982 | Gouzos | |
| 5,862,541 | A | 1/1999 | Mailhot | |
| 7,550,078 | B2 | 6/2009 | Meagher | |
| 8,387,174 | B1 | 3/2013 | Gillespie | |
| 2011/0056940 | A1 | 3/2011 | Goffman | |
| 2018/0147507 | A1* | 5/2018 | Angelino | .............. E04H 4/1272 |

FOREIGN PATENT DOCUMENTS

CA          1142303         3/1983

* cited by examiner

*Primary Examiner* — Tuan N Nguyen
(74) *Attorney, Agent, or Firm* — Kyle A. Fletcher, Esq.

(57) ABSTRACT

The insect trap for a pool skimmer basket comprises a cylindrical container and a basket cover plate. The insect trap for a pool skimmer basket may be an insert for a skimmer of a swimming pool that provides an exit path for insects caught in a skimmer basket. The basket cover plate may replace an original skimmer basket cover with the cylindrical container removably coupled to a bottom surface of the basket cover plate such that the cylindrical container hangs down into pool water. A plurality of apertures located in the cylindrical container and on the basket cover plate may allow the insects to crawl between an inner surface and an outer surface of the cylindrical container and through the basket cover plate. A plurality of luminescent rings coupled to the basket cover plate may guide the insects at night.

19 Claims, 6 Drawing Sheets

INSECT TRAP FOR A POOL SKIMMER BASKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of swimming pool maintenance and wildlife conservation, more specifically, an insect trap for a pool skimmer basket.

SUMMARY OF INVENTION

The insect trap for a pool skimmer basket comprises a cylindrical container and a basket cover plate. The insect trap for a pool skimmer basket may be an insert for a skimmer of a swimming pool that provides an exit path for insects caught in a skimmer basket. The basket cover plate may replace an original skimmer basket cover with the cylindrical container removably coupled to a bottom surface of the basket cover plate such that the cylindrical container hangs down into pool water. A plurality of apertures located in the cylindrical container and on the basket cover plate may allow the insects to crawl between an inner surface and an outer surface of the cylindrical container and through the basket cover plate. A plurality of luminescent rings coupled to the basket cover plate may guide the insects at night.

An object of the invention is to provide an exit path for insects caught in a skimmer basket of a swimming pool.

Another object of the invention is to replace an original skimmer basket cover with a basket cover plate comprising a cylindrical container suspended from the basket cover plate and hanging into the water of the pool.

A further object of the invention is to provide a plurality of crawl out apertures on the basket cover plate and a plurality of crawl through apertures on the cylindrical container.

Yet another object of the invention is to provide a plurality of luminescent rings surrounding the plurality of crawl out apertures.

These together with additional objects, features and advantages of the insect trap for a pool skimmer basket will be readily apparent to those of ordinary skill in the art upon reading the following detailed description of the presently preferred, but nonetheless illustrative, embodiments when taken in conjunction with the accompanying drawings.

In this respect, before explaining the current embodiments of the insect trap for a pool skimmer basket in detail, it is to be understood that the insect trap for a pool skimmer basket is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the insect trap for a pool skimmer basket.

It is therefore important that the claims be regarded as including such equivalent construction insofar as they do not depart from the spirit and scope of the insect trap for a pool skimmer basket. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
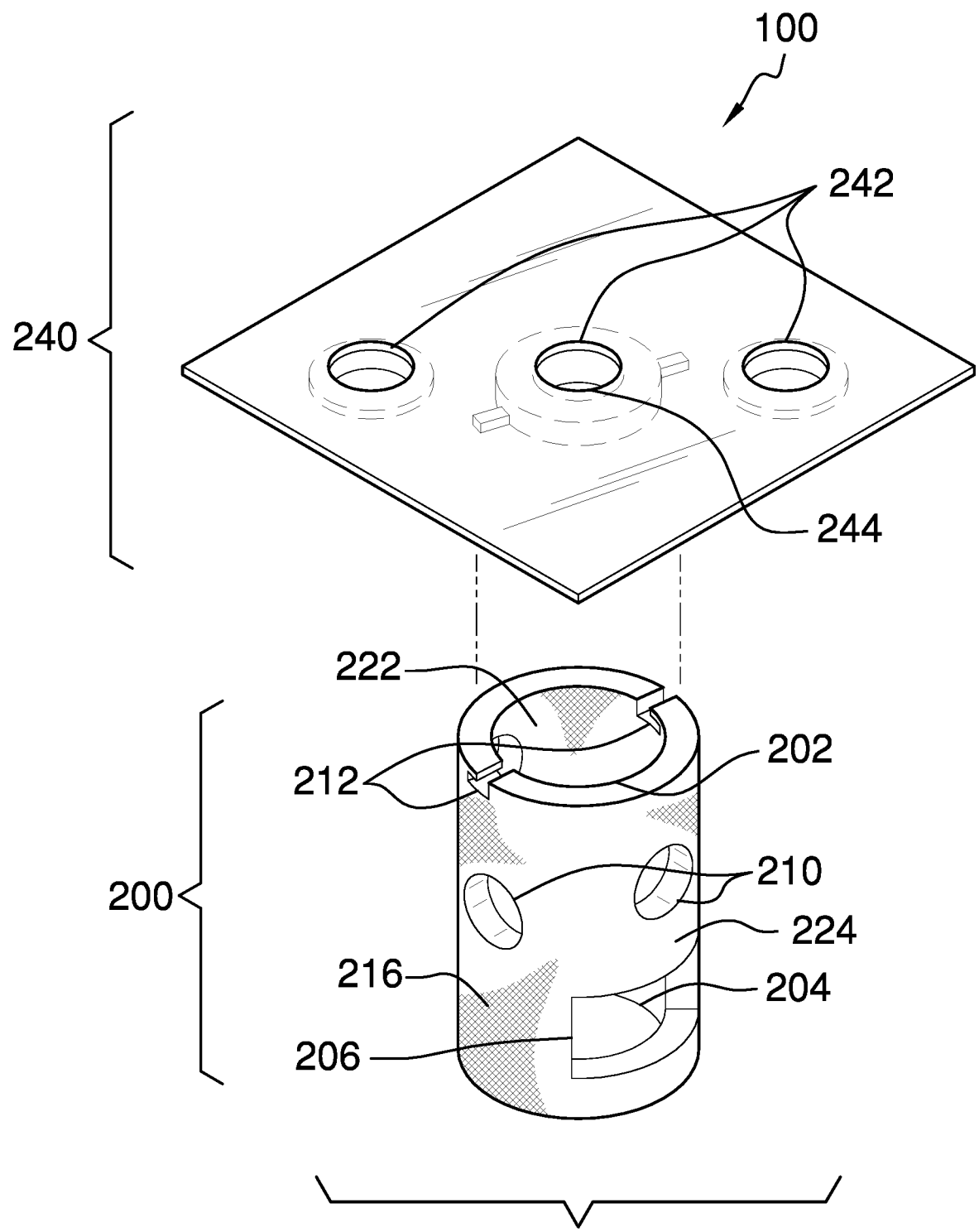
FIG. 1 is an isometric view of an embodiment of the disclosure.
Figure 2:
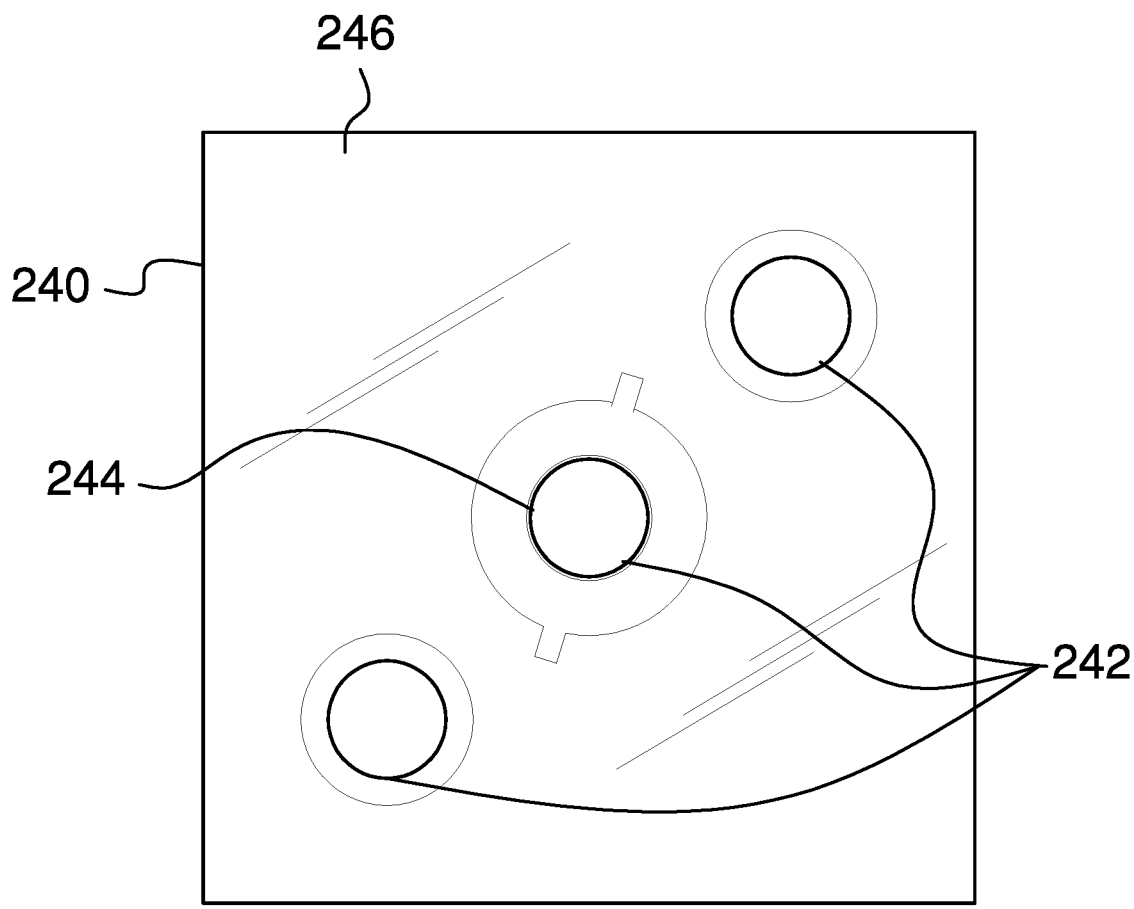
FIG. 2 is a top view of an embodiment of the disclosure.
Figure 2:
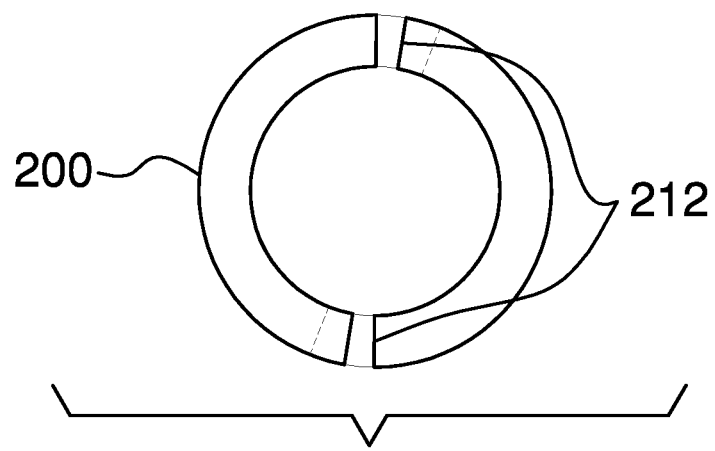
Figure 3:
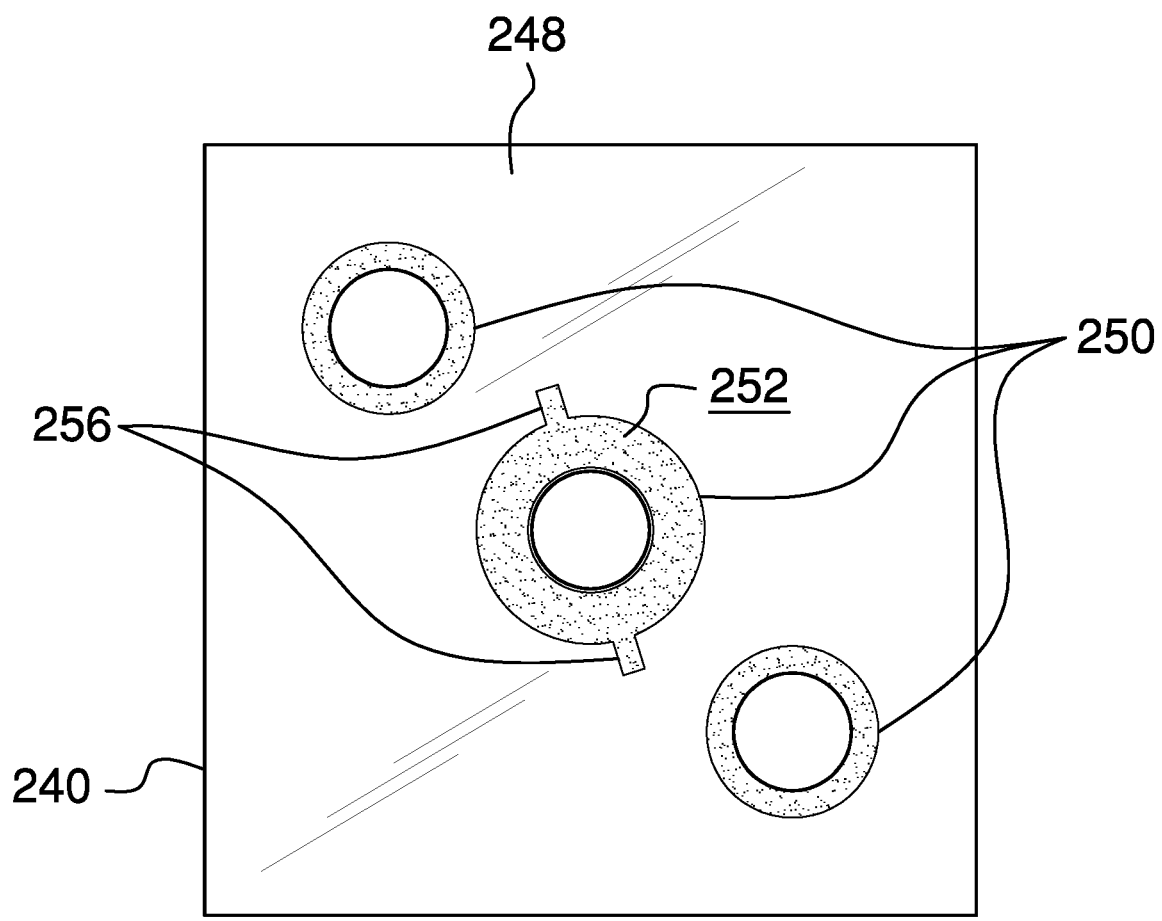
FIG. 3 is a bottom view of an embodiment of the disclosure.
Figure 4:
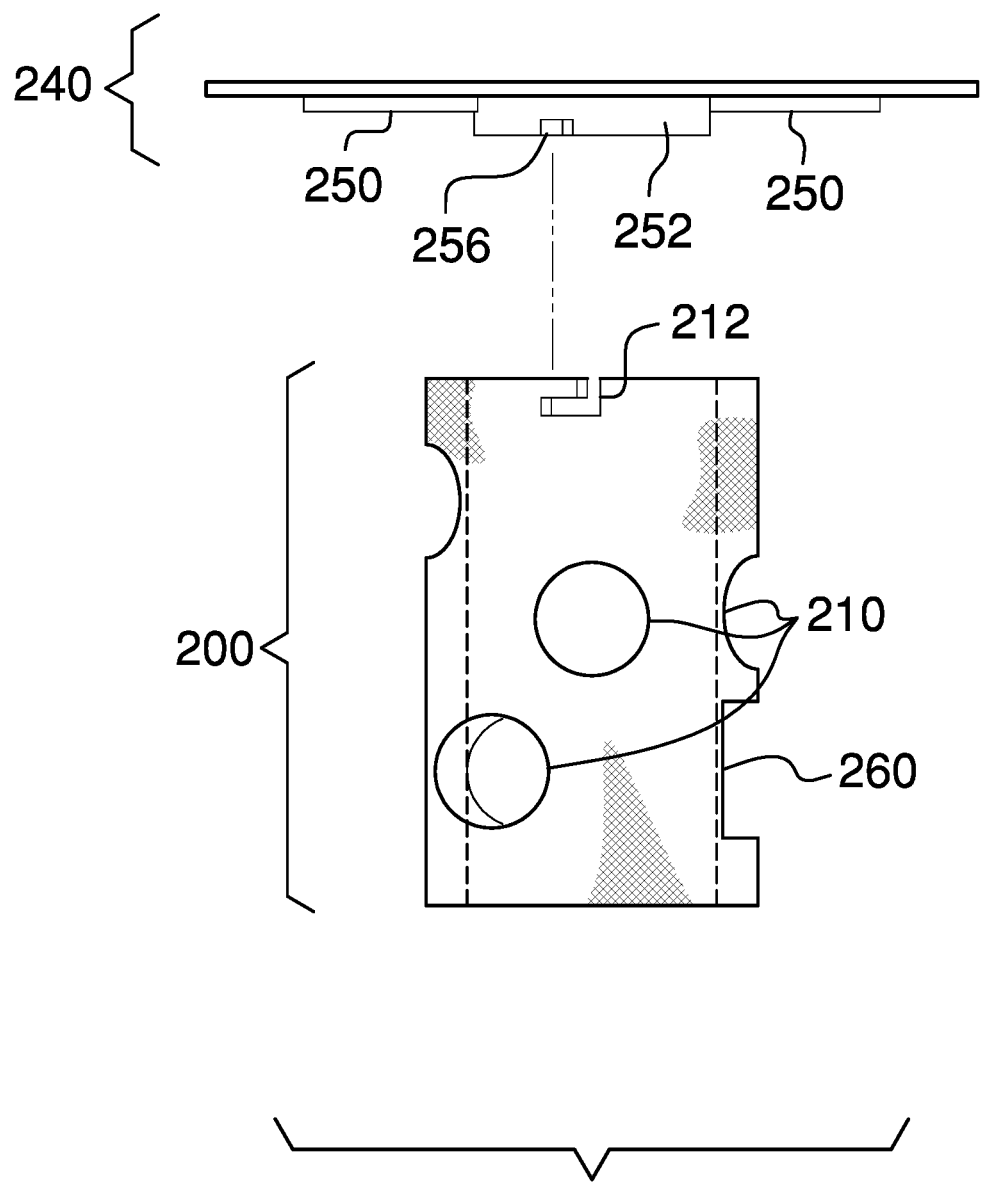
FIG. 4 is an exploded side view of an embodiment of the disclosure.
Figure 5:
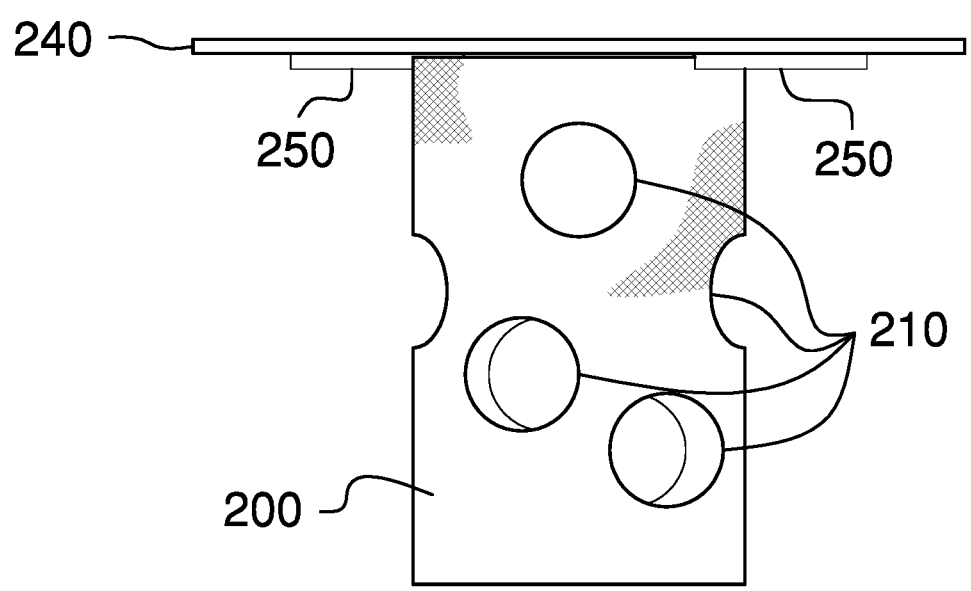
FIG. 5 is a side view of an embodiment of the disclosure.
Figure 6:
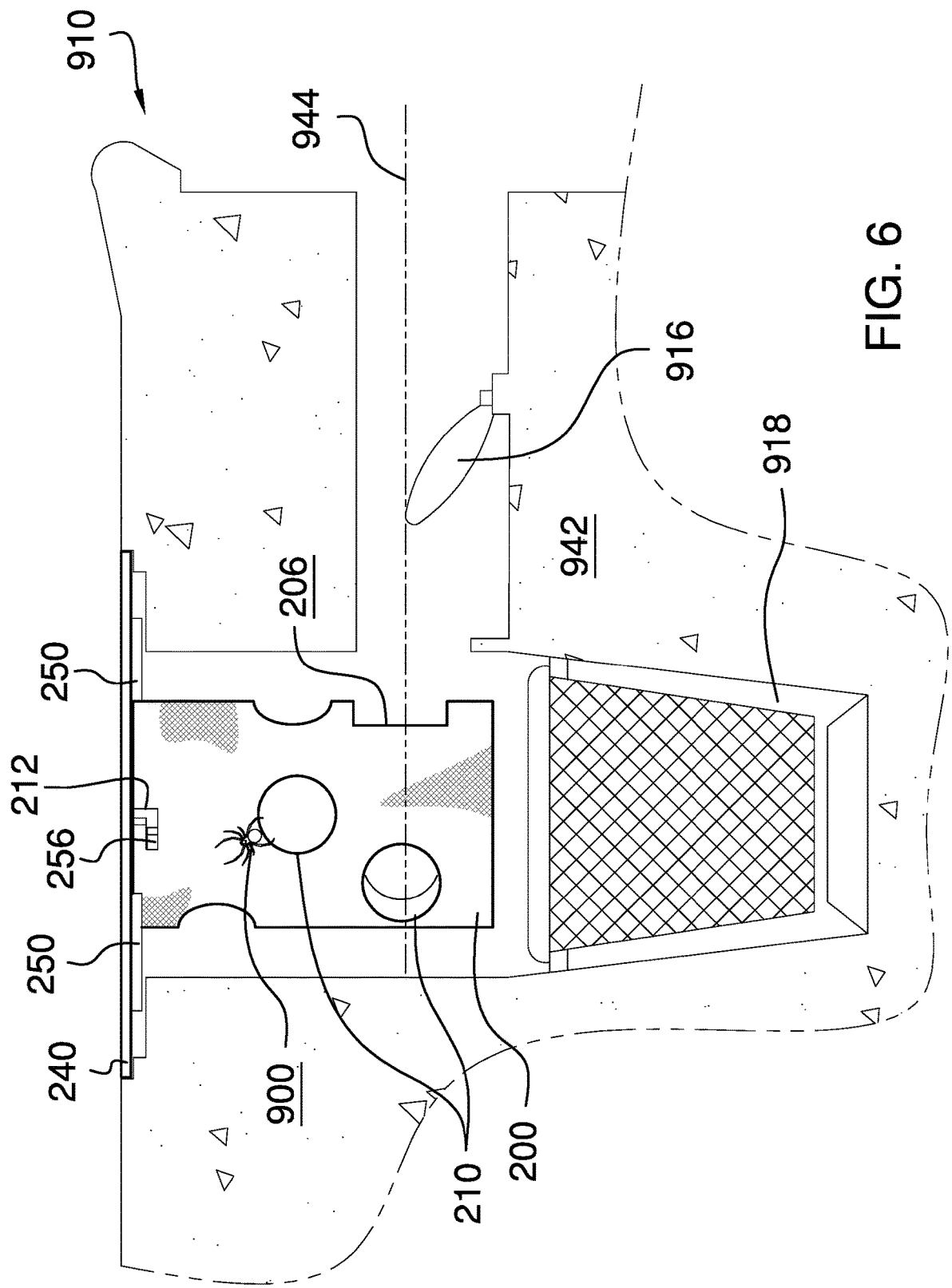
FIG. 6 is an in-use view of an embodiment of the disclosure.

Detailed reference will now be made to a first potential embodiment of the disclosure, which is illustrated in FIGS. 1 through 6.

The insect trap for a pool skimmer basket 100 (hereinafter invention) comprises a cylindrical container 200 and a basket cover plate 240. The invention 100 may be an insert for a skimmer of a swimming pool 910 that provides an exit path for insects 900 caught in a skimmer basket 918. The basket cover plate 240 may replace an original skimmer basket cover with the cylindrical container 200 removably coupled to a bottom surface 248 of the basket cover plate 240 such that the cylindrical container 200 hangs down into pool water 942. A plurality of apertures located in the cylindrical container 200 and on the basket cover plate 240 may allow the insects 900 to crawl between an inner surface 222 and an outer surface 224 of the cylindrical container 200 and through the basket cover plate 240. A plurality of luminescent rings 250 coupled to the basket cover plate 240 may guide the insects 900 at night.

The cylindrical container 200 may be an annular cylinder comprising a top aperture 202 at the top end of the cylindrical container 200 and a bottom aperture 204 at the bottom end of the cylindrical container 200. The cylindrical container 200 may comprise a plurality of crawl through apertures 210 that provide passage from the inner surface 222 of the cylindrical container 200 to the outer surface 224 of the cylindrical container 200. The cylindrical container 200 may further comprise a mouth aperture 206. The mouth aperture 206 may be a horizontally oriented, rectangular aperture that is positioned such that the mouth aperture 206 is positioned at a water line 944 when the invention 100 is installed at the skimmer. The mouth aperture 206 may also be turned to face a weir 916 such that as the skimmer pulls the pool water 942 into the skimmer basket 918, the pool water 942 passes through the mouth aperture 206 of the cylindrical container 200.

The top edge of the cylindrical container 200 may comprise two or more locking notches 212. The two or more locking notches 212 may interlock with two or more latching tabs 256 located on the basket cover plate 240 such that the cylindrical container 200 may removably couple with the basket cover plate 240. In some embodiments, an individual notch selected from the two or more locking notches 212 may have an L-shape that extends vertically downward and then horizontally. The two or more locking notches 212 may be equally space around the top edge of the cylindrical container 200.

The basket cover plate 240 may replace the original skimmer basket cover and may therefore be the same shape and size as the original skimmer basket cover. As a non-limiting example, the basket cover plate 240 may be a square plate. The basket cover plate 240 may comprise a plurality of crawl out apertures 242 that provide passage from the bottom surface 248 of the basket cover plate 240 to a top surface 246 of the basket cover plate 240. The basket cover plate 240 may comprise a center aperture 244 located at the center of the basket cover plate 240.

The basket cover plate 240 may comprise the plurality of luminescent rings 250 which are coupled to the basket cover plate 240 and which surround each of the plurality of crawl out apertures 242 and the center aperture 244. In some embodiments, the plurality of luminescent rings 250 may be coupled to the bottom surface 248 of the basket cover plate 240. The plurality of luminescent rings 250 may be annular disks made of a photoluminescent material. The plurality of luminescent rings 250 may absorb sunlight during the day and may produce a photoluminescent glow at night. The photoluminescent glow may attract the insects 900 towards the plurality of crawl out apertures 242. A center ring 252 may be one of the plurality of luminescent rings 250 that surrounds the center aperture 244. The outside diameter of the center ring 252 may be less than or equal to the inside diameter of the cylindrical container 200 measured at the top aperture 202.

The two or more latching tabs 256 may be horizontal projections from the center ring 252. There may be as many of the two or more latching tabs 256 as there are the two or more locking notches 212. The size and spacing of the two or more latching tabs 256 may be such that the cylindrical container 200 may couple to the center ring 252 when the two or more latching tabs 256 and the two or more locking notches 212 are engaged. In some embodiments, engaging the two or more latching tabs 256 and the two or more locking notches 212 may involve aligning the two or more latching tabs 256 with the two or more locking notches 212, inserting the two or more latching tabs 256 into the two or more locking notches 212, and twisting the cylindrical container 200. The cylindrical container 200 may be removed from the basket cover plate 240 by reversing the steps. As a non-limiting example, the cylindrical container 200 may be decoupled from the basket cover plate 240 by twisting the cylindrical container 200 in the opposite direction and pulling the two or more latching tabs 256 out of the two or more locking notches 212.

In some embodiments, the inner surface 222 of the cylindrical container 200, the outer surface 224 of the cylindrical container 200, the top surface 246 of the basket cover plate 240, the bottom surface 248 of the basket cover plate 240, or combinations thereof may comprise a textured surface 216 such that the insects 900 may find traction for climbing.

In some embodiments, the basket cover plate 240 may be clear or translucent such that the sunlight may reach the plurality of luminescent rings 250 during the day.

In use, the cylindrical container 200 may be coupled to the basket cover plate 240 by engaging the two or more latching tabs 256 on the center ring 252 of the basket cover plate 240 with the two or more locking notches 212 on the cylindrical container 200. The original skimmer basket cover over the skimmer may be removed and replaced by the basket cover plate 240. The basket cover plate 240 may be oriented such that the cylindrical container 200 is suspended below the basket cover plate 240 and reaches the pool water 942. During periods of operation of a pool pump, the pool water 942 may be sucked into the skimmer basket 918 through the mouth aperture 206 of the cylindrical container 200 and may carry the insects 900 into the skimmer basket 918. When the pool pump is not operating, the insects 900 may utilize the cylindrical container 200, the plurality of crawl through apertures 210, and the plurality of crawl out apertures 242 to exit from the skimmer. During daylight hours, the plurality of luminescent rings 250 may absorb the sunlight. At night, the photoluminescent glow from the plurality of luminescent rings 250 may guide the insects 900 to the plurality of crawl out apertures 242.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, an "aperture" may be an opening in a surface. Aperture may be synonymous with hole, slit, crack, gap, slot, or opening.

As used herein, the words "couple", "couples", "coupled" or "coupling", may refer to connecting, either directly or indirectly, and does not necessarily imply a mechanical connection.

As used in this disclosure, a "cylinder" may be a geometric structure defined by two identical flat and parallel ends, also commonly referred to as bases, which are circular in shape and connected with a single curved surface which may be referred to as the face. The axis of the cylinder is formed by the straight line that connects the center of each of the two identical flat and parallel ends of the cylinder. Unless otherwise stated within this disclosure, the term cylinder specifically indicates a right cylinder which is defined as a cylinder wherein the curved surface perpendicularly intersects with the two identical flat and parallel ends.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "inside diameter" or "inner diameter" may refer to a measurement made on a hollow object. Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, a "notch" may be an indentation formed in an edge or a cavity or aperture formed within a surface.

As used herein, "outside diameter" or "outer diameter" may refer to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used herein, "photoluminescent" may refer to an optical property of a material to emit light after absorbing photons from an incident light source.

As used in this disclosure, "translucent" may refer to a material that allows light to pass through the material but that significantly scatters the light such that an object cannot be clearly seen through the material.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An insect trap for a pool skimmer basket comprising:
    a cylindrical container and a basket cover plate;
    wherein the insect trap for a pool skimmer basket is an insert for a skimmer of a swimming pool that provides an exit path for insects caught in a skimmer basket;
    wherein the basket cover plate replaces an original skimmer basket cover with the cylindrical container removably coupled to a bottom surface of the basket cover plate such that the cylindrical container hangs down into pool water;
    wherein a plurality of apertures located in the cylindrical container and on the basket cover plate allow the insects to crawl between an inner surface and an outer surface of the cylindrical container and through the basket cover plate;
    wherein a plurality of luminescent rings coupled to the basket cover plate guide the insects at night.

2. The insect trap for a pool skimmer basket according to claim 1
    wherein the cylindrical container is an annular cylinder comprising a top aperture at the top end of the cylindrical container and a bottom aperture at the bottom end of the cylindrical container;
    wherein the cylindrical container comprises a plurality of crawl through apertures that provide passage from the inner surface of the cylindrical container to the outer surface of the cylindrical container;
    wherein the cylindrical container further comprises a mouth aperture;
    wherein the mouth aperture is a horizontally oriented, rectangular aperture that is positioned such that the mouth aperture is positioned at a water line when the insect trap for a pool skimmer basket is installed at the skimmer.

3. The insect trap for a pool skimmer basket according to claim 2
    wherein the mouth aperture is turned to face a weir such that as the skimmer pulls the pool water into the skimmer basket, the pool water passes through the mouth aperture of the cylindrical container.

4. The insect trap for a pool skimmer basket according to claim 3
    wherein the top edge of the cylindrical container comprises two or more locking notches;
    wherein the two or more locking notches interlock with two or more latching tabs located on the basket cover plate such that the cylindrical container removably couples with the basket cover plate.

5. The insect trap for a pool skimmer basket according to claim 4
    wherein an individual notch selected from the two or more locking notches has an L-shape that extends vertically downward and then horizontally.

6. The insect trap for a pool skimmer basket according to claim 5
    wherein the two or more locking notches are equally space around the top edge of the cylindrical container.

7. The insect trap for a pool skimmer basket according to claim 5
    wherein the basket cover plate replaces the original skimmer basket cover and is the same shape and size as the original skimmer basket cover.

8. The insect trap for a pool skimmer basket according to claim 7 wherein the basket cover plate is a square plate.

9. The insect trap for a pool skimmer basket according to claim 7
wherein the basket cover plate comprises a plurality of crawl out apertures that provide passage from the bottom surface of the basket cover plate to a top surface of the basket cover plate.

10. The insect trap for a pool skimmer basket according to claim 9
wherein the basket cover plate comprises a center aperture located at the center of the basket cover plate.

11. The insect trap for a pool skimmer basket according to claim 10
wherein the basket cover plate comprises the plurality of luminescent rings which are coupled to the basket cover plate and which surround each of the plurality of crawl out apertures and the center aperture.

12. The insect trap for a pool skimmer basket according to claim 11
wherein the plurality of luminescent rings are coupled to the bottom surface of the basket cover plate.

13. The insect trap for a pool skimmer basket according to claim 11
wherein the plurality of luminescent rings are annular disks made of a photoluminescent material;
wherein the plurality of luminescent rings absorb sunlight during the day and produce a photoluminescent glow at night;
wherein the photoluminescent glow attracts the insects towards the plurality of crawl out apertures.

14. The insect trap for a pool skimmer basket according to claim 13
wherein a center ring is one of the plurality of luminescent rings that surrounds the center aperture;
wherein the outside diameter of the center ring is less than or equal to the inside diameter of the cylindrical container measured at the top aperture.

15. The insect trap for a pool skimmer basket according to claim 14
wherein the two or more latching tabs are horizontal projections from the center ring;
wherein there are as many of the two or more latching tabs as there are the two or more locking notches;
wherein the size and spacing of the two or more latching tabs are such that the cylindrical container couples to the center ring when the two or more latching tabs and the two or more locking notches are engaged.

16. The insect trap for a pool skimmer basket according to claim 15
wherein engaging the two or more latching tabs and the two or more locking notches involves aligning the two or more latching tabs with the two or more locking notches, inserting the two or more latching tabs into the two or more locking notches, and twisting the cylindrical container.

17. The insect trap for a pool skimmer basket according to claim 16
wherein the cylindrical container is removed from the basket cover plate by reversing the steps of engaging the two or more latching tabs and the two or more locking notches.

18. The insect trap for a pool skimmer basket according to claim 17
wherein the inner surface of the cylindrical container, the outer surface of the cylindrical container, the top surface of the basket cover plate, the bottom surface of the basket cover plate, or combinations thereof comprise a textured surface such that the insects find traction for climbing.

19. The insect trap for a pool skimmer basket according to claim 17
wherein the basket cover plate is clear or translucent such that the sunlight reaches the plurality of luminescent rings during the day.

\* \* \* \* \*